US010442952B2

(12) United States Patent
Raghavanpillai et al.

(10) Patent No.: US 10,442,952 B2
(45) Date of Patent: Oct. 15, 2019

(54) DURABLE ARCHITECTURAL COATINGS CONTAINING CROSSLINKABLE POLYMERIC ADDITIVES

(71) Applicant: THE CHEMOURS COMPANY TT, LLC, Harrisburg, PA (US)

(72) Inventors: Anilkumar Raghavanpillai, Wilmington, DE (US); Brad M. Rosen, Philadelphia, PA (US); James J. Hughes, Wilmington, DE (US); Vincent Franco, Wilmington, DE (US); John Russell Crompton, Jr., Bear, DE (US); Kai Qi, Wilmington, DE (US); Michael Henry Ober, Newark, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 134 days.

(21) Appl. No.: 15/569,104

(22) PCT Filed: Apr. 27, 2016

(86) PCT No.: PCT/US2016/029466
§ 371 (c)(1),
(2) Date: Oct. 25, 2017

(87) PCT Pub. No.: WO2016/176270
PCT Pub. Date: Nov. 3, 2016

(65) Prior Publication Data
US 2018/0112097 A1    Apr. 26, 2018

Related U.S. Application Data

(60) Provisional application No. 62/154,767, filed on Apr. 30, 2015.

(51) Int. Cl.
| C09D 133/10 | (2006.01) |
| C09D 7/65 | (2018.01) |
| C08L 29/04 | (2006.01) |
| C08L 33/08 | (2006.01) |
| C08L 33/10 | (2006.01) |
| C09D 129/04 | (2006.01) |
| C09D 133/08 | (2006.01) |

(52) U.S. Cl.
CPC ............ C09D 133/10 (2013.01); C08L 29/04 (2013.01); C08L 33/08 (2013.01); C08L 33/10 (2013.01); C09D 7/65 (2018.01); C09D 129/04 (2013.01); C09D 133/08 (2013.01)

(58) Field of Classification Search
CPC .. C09D 133/02; C09D 133/04; C09D 133/08; C09D 133/064; C09D 133/066; C09D 133/10; C09D 133/14; C09D 133/16
See application file for complete search history.

(56) References Cited

U.S. PATENT DOCUMENTS

| 4,948,850 A | 8/1990 | Hasenbein et al. |
| 5,066,705 A | 11/1991 | Wickert |
| 5,574,083 A | 11/1996 | Brown et al. |
| 5,629,372 A | 5/1997 | Anton |
| 5,633,344 A | 5/1997 | Figuly |
| 6,727,314 B2 | 4/2004 | Burghart et al. |
| 6,841,641 B2 | 1/2005 | Olson et al. |
| 7,247,671 B2 | 7/2007 | Overbeek et al. |
| 7,592,405 B2 | 9/2009 | Otaguro et al. |
| 8,431,664 B2 | 4/2013 | Hoshino |
| 8,563,672 B2 | 10/2013 | Shenoy et al. |
| 2013/0078397 A1 | 3/2013 | Chao et al. |
| 2015/0240090 A1* | 8/2015 | Raghavanpillai ........ C09D 5/00 523/411 |

FOREIGN PATENT DOCUMENTS

| CN | 102219878 A | 10/2011 |
| CN | 103087255 B | 10/2013 |
| CN | 103408692 A | 11/2013 |
| CN | 103980455 A | 8/2014 |
| EP | 1957089 A2 | 8/2008 |
| FR | 2730736 A1 | 6/1997 |
| JP | 62240303 A | 10/1987 |
| JP | 01223168 A | 9/1989 |
| JP | 1892104 C | 12/1994 |
| JP | 08193107 A | 7/1996 |
| JP | 0967417 A | 3/1997 |
| JP | 11172190 A | 6/1999 |
| JP | 11256070 A | 9/1999 |

(Continued)

OTHER PUBLICATIONS

Outlines of Paint Technology (Halstead Press, New York, NY, Third edition, 1990).
Honda, et al., in Macromolecules, 2005, 38, 5699-5705.
C. R. Martens in "Emulsion and Water-Soluble Paints and Coatings" (Reinhold Publishing Corporation, New York, NY, 1965).
International Search Report and Written Opinion for PCT/US16/029466, dated Jul. 5, 2016.
Altintas, Z., et al.; Preparation of photocurable silica-titania hybrid coatings by an anhydrous sol-gel process Journal of Sol-Gel Science and Technology (2011), 58(3), 612-618.
Liang, J.; et al., Low loss, low refractive index fluorinated self-crosslinking polymer waveguides for optical applications, Optical Materials (Amsterdam) (1998), 9(1-4), 230-235.

(Continued)

Primary Examiner — Vu A Nguyen

(57) ABSTRACT

The present invention comprises a composition and method of use for providing durable dirt pickup resistance to architectural coatings. Such compositions comprise a coating base and a post-modified crosslinkable fluoropolymer additive, such that the coatings additive is allowed to migrate to the coating surface and further cure once applied to a substrate. The compositions of the present invention provide durability to coating compositions, while also providing surface effects such as increased water and oil contact angles, enhanced dirt pickup resistance, and enhanced cleanability to the coating films.

16 Claims, No Drawings

(56) References Cited

FOREIGN PATENT DOCUMENTS

| | | |
|---|---|---|
| JP | 2006117742 A | 5/2006 |
| JP | 4561977 B2 | 10/2010 |
| JP | 2011032352 A | 2/2011 |
| KR | 20080090779 A | 9/2008 |
| KR | 101134273 A | 4/2012 |
| WO | 9951430 A1 | 10/1999 |
| WO | 03006511 A2 | 1/2003 |
| WO | 200767622 A3 | 6/2007 |
| WO | 2009014684 A2 | 1/2009 |
| WO | 2007103505 A1 | 9/2017 |

OTHER PUBLICATIONS

Tillet, et al.; Chemical reactions of polymer crosslinking and post-crosslinking at room and medium temperature; Progress in Polymer Science 36 (2011) 191-217.
Surface Coatings vol. I, Raw Materials and Their Usage (Chapman and Hall, New York, NY, Second Edition, 1984).

* cited by examiner

DURABLE ARCHITECTURAL COATINGS CONTAINING CROSSLINKABLE POLYMERIC ADDITIVES

FIELD OF THE INVENTION

This invention relates to a crosslinkable fluorinated polymer compound and its use as an additive in architectural coating compositions such as water-based latex paints, to provide durable surface effects.

BACKGROUND OF THE INVENTION

The coating compositions of interest in the present invention include alkyd coating compositions, urethane coating compositions, water-dispersible coating compositions, and unsaturated polyester coating compositions, typically a paint, clear coating, or stain. All of the above-listed coating compositions after drying or curing often show low hexadecane contact angles, are readily wetted by oil, and are susceptible to soiling. The coating compositions are described in *Outlines of Paint Technology* (Halstead Press, New York, N.Y., Third edition, 1990) and *Surface Coatings Vol. I, Raw Materials and Their Usage* (Chapman and Hall, New York, N.Y., Second Edition, 1984).

Fluorinated polymer compositions are used in the preparation of a wide variety of surface treatment materials to provide surface effects to substrates. Many such compositions are fluorinated acrylate polymers or copolymers which contain predominantly eight or more carbons in the perfluoroalkyl chain to provide the desired properties. Honda, et al., in *Macromolecules*, 2005, 38, 5699-5705 teach that for perfluoroalkyl chains of greater than 8 carbons, orientation of the perfluoroalkyl groups, designated $R_f$ groups, is maintained in a parallel configuration while for such chains having 6 or less carbons, reorientation occurs. This reorientation is recited to decrease surface properties such as contact angle. Thus, polymers containing shorter perfluoroalkyl chains have traditionally not been commercially successful.

Crosslinkable acrylic polymers have been used as film resins for forming durable coatings. The polymer systems in U.S. Pat. No. 6,727,314 incorporate castor oil methacrylate monomers into homopolymeric or copolymeric resin systems for high-tensile strength films. As such polymeric systems are designed to function as the main coating components, they typically have molecular weights that prohibit migration to the surface. Additionally, the polymer compounds do not have the required fluorinated and long-chain alkyl hydrophobic functionality to provide cleanability and dirt pickup resistance when used as an additive in a coating composition.

BRIEF SUMMARY OF THE INVENTION

Water-based latex coating bases, such as those employed as paint coatings, have a tendency to have low oil-repellency and poor cleanability against dust and stains. To impart better cleanability to interior and exterior paint surfaces, small molecule additives, including fluorosurfactants, have been used. Due to their small molecular size, however, the additives do not provide long-term performance and durability in exterior paint, which is subjected to more extreme environmental conditions. The additives can wash away from the coating surface within a few days.

The present invention addresses the issues described above by introducing copolymers of fluoroalkyl (meth)acrylate with hydroxyl group-containing or carboxylic acid-containing monomers, which have been post-modified to contain a crosslinkable functional group. Such a crosslinkable group may be further reacted with other polymeric additives containing cross-linkable entities (ethylenic unsaturated groups) or with other components of the coating composition. Due to the polymeric and crosslinkable nature of the fluoroadditive, the compositions of the present invention provide repellency performance as well as durability to the water-based latex coatings. Additionally, the low molecular weight allows the polymers to migrate to the coating surface before crosslinking to form a durable additive at the coating surface. The polymers of the invention impart unexpectedly desirable surface effects such as: increased water and oil repellency, enhanced dirt pickup resistance, and enhanced cleanability to the coating films.

The present invention comprises a composition comprising (a) a coating base selected from a water-dispersed coating, an epoxy polymer coating, an alkyd coating, a Type I urethane coating, or an unsaturated polyester coating; and (b) a crosslinkable polymer made by reacting: (i) a fluoropolymer comprising the repeat Unit A, at least one of repeat Units B or C, and optionally one or more of repeat Units D or E, in any order; with

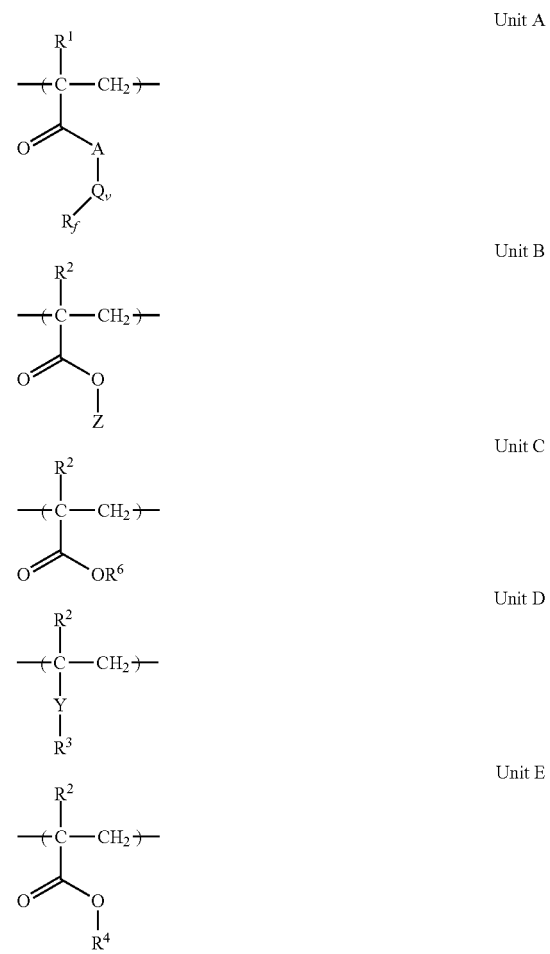

(ii) a hydroxyl-reactive compound or carboxylic acid-reactive compound selected from the group consisting of a polyamine compound having at least 2 amine groups, an isocyanate-terminated silane, an isocyanate-terminated vinylic or (meth)acrylic compound, a glycidyl group-containing vinylic or (meth)acrylic compound, a carbodiimide compound, a blend of polyisocyanate with a hydroxyl-terminated vinylic or (meth)acrylic compound, and mixtures thereof; wherein the composition comprises (a) the coating base in an amount of from about 95 to 99.98% and (b) the crosslinkable polymer in an amount of from about 0.02 to 5% by weight, based on the total weight of (a) and (b); $R_f$ is a straight or branched-chain perfluoroalkyl group of 2 to 20 carbon atoms, optionally interrupted by one or more ether oxygens —O—, —CH$_2$—, —CFH—, or combinations thereof; A is O, S, or N(R$^2$); Q is a straight chain, branched chain or cyclic structure of alkylene, alkoxy, arylene, aralkylene, sulfonyl, sulfoxy, sulfonamido, carbonamido, carbonyloxy, urethanylene, ureylene, or combinations of such linking groups; v is 0 or 1; R$^1$ is H or CH$_3$; R$^2$ is independently selected from H or a linear or branched alkyl of 1 to about 4 carbon atoms; Z is a hydrophilic group selected from a hydroxy-terminated straight or branched alkyl of 1 to 10 carbons; hydroxy-terminated straight or branched alkoxylate having 2 to 20 alkoxylate repeat units; or hydroxyalkyl-terminated straight or branched alkoxylate having 2 to 20 alkoxylate repeat units; R$^3$ is a straight or branched alkyl chain of 2 to 30 carbons having 1 to 15 olefinic units, or mixtures thereof; Y is selected from —CH$_2$O—, —C(O)O—, —OC(O)—, —R$^5$OC(O)—, —C(O)O(CH$_2$CH$_2$O)$_m$(CH$_2$CH(CH$_3$)O)$_n$—, or —C(O)OR$^5$O—; R$^5$ is a straight or branched alkylene of 1 to 10 carbons; m and n are independently integers of 0 to 20, provided that m+n>0; R$^4$ is a straight chain, branched chain, or cyclic structure alkyl group of 1 to 30 carbons; R$^6$ is H, Na, Li, Cs, K, HN(R$^2$)$_3$, or mixtures thereof; Unit A is present in an amount of about 10 to 60 mol %; Unit B is present in an amount of about 0 to 40 mol %; Unit C is present in an amount of about 0 to 40 mol %; Unit D is present in an amount of about 0 to 50 mol %; and Unit E is present in an amount of about 0 to 50 mol %; wherein the sum of Units B and C amounts is a positive mol %, and wherein the sum of monomer repeat units is equal to 100%.

In another embodiment, the invention comprises A process of for forming a coating with improved dirt pickup resistance comprising (a) contacting a coating base selected from a water-dispersed coating, an epoxy polymer coating, an alkyd coating, a Type I urethane coating, or an unsaturated polyester coating; with a crosslinkable polymer; (b) applying the mixture to a substrate to form a coating; (c) allowing the crosslinkable polymer to migrate to the coating surface to form a crosslinkable surface coating, and (d) subsequently reacting the crosslinkable surface coating; wherein the coating comprises the coating base in an amount of from about 95 to 99.98% and the crosslinkable polymer in an amount of from about 0.02 to 5% by weight, based on the total weight of the coating base and the crosslinkable polymer; the crosslinkable polymer is the reaction product of (i) a fluoropolymer comprising the repeat Unit A, at least one of repeat Units B or C, and optionally one or more of repeat Units D or E, in any order; with (ii) a hydroxyl-reactive compound or carboxylic acid-reactive compound selected from the group consisting of a polyamine compound having at least 2 amine groups, an isocyanate-terminated silane, an isocyanate-terminated vinylic or (meth)acrylic compound, a glycidyl group-containing vinylic or (meth)acrylic compound, a carbodiimide compound, a blend of polyisocyanate with a hydroxyl-terminated vinylic or (meth)acrylic compound, and mixtures thereof; wherein $R_f$ is a straight or branched-chain perfluoroalkyl group of 2 to 20 carbon atoms, optionally interrupted by one or more ether oxygens —O—, —CH$_2$—, —CFH—, or combinations thereof; A is O, S, or N(R$^2$); Q is a straight chain, branched chain or cyclic structure of alkylene, alkoxy, arylene, aralkylene, sulfonyl, sulfoxy, sulfonamido, carbonamido, carbonyloxy, urethanylene, ureylene, or combinations of such linking groups; v is 0 or 1; R$^1$ is H or CH$_3$; R$^2$ is independently selected from H or a linear or branched alkyl of 1 to about 4 carbon atoms; Z is a hydrophilic group selected from a hydroxy-terminated straight or branched alkyl of 1 to 10 carbons; hydroxy-terminated straight or branched alkoxylate having 2 to 20 alkoxylate repeat units; or hydroxyalkyl-terminated straight or branched alkoxylate having 2 to 20 alkoxylate repeat units; R$^3$ is a straight or branched alkyl chain of 2 to 30 carbons having 1 to 15 olefinic units, or mixtures thereof; Y is selected from —CH$_2$O—, —C(O)O—, —OC(O)—, —R$^5$OC(O)—, —C(O)O(CH$_2$CH$_2$O)$_m$(CH$_2$CH(CH$_3$)O)$_n$—, or —C(O)OR$^5$O—; R$^5$ is a straight or branched alkylene of 1 to 10 carbons; m and n are independently integers of 0 to 20, provided that m+n>0; R$^4$ is a straight chain, branched chain, or cyclic structure alkyl group of 1 to 30 carbons; R$^6$ is H, Na, Li, Cs, K, HN(R$^2$)$_3$, or mixtures thereof; Unit A is present in an amount of about 10 to 60 mol %; Unit B is present in an amount of about 0 to 40 mol %; Unit C is present in an amount of about 0 to 40 mol %; Unit D is present in an amount of about 0 to 50 mol %; and Unit E is present in an amount of about 0 to 50 mol %; wherein the sum of Units B and C amounts is a positive mol %, and wherein the sum of monomer repeat units is equal to 100%.

DETAILED DESCRIPTION OF THE INVENTION

Herein trademarks are shown in upper case.

The terms "(meth)acrylic" or "(meth)acrylate" indicate, respectively, methacrylic and/or acrylic, and methacrylate and/or acrylate; and the term (meth)acrylamide indicates methacrylamide and/or acrylamide.

By the term "alkyd coating" as used hereinafter is meant a conventional liquid coating based on alkyd resins, typically a paint, clear coating, or stain. The alkyd resins are complex branched and cross-linked polyesters containing unsaturated aliphatic acid residues.

By the term "urethane coating" as used hereinafter is meant a conventional liquid coating based on Type I urethane resins, typically a paint, clear coating, or stain. Urethane coatings typically contain the reaction product of a polyisocyanate, usually toluene diisocyanate, and a polyhydric alcohol ester of drying oil acids. Urethane coatings are classified by ASTM D16 into five categories. Type I urethane coatings contain a minimum of 10% by weight of a pre-reacted autoxidizable binder, characterized by the absence of significant amounts of free isocyanate groups. These are also known as uralkyds, urethane-modified alkyds, oil-modified urethanes, urethane oils, or urethane alkyds. Type I urethane coatings are the largest volume category of polyurethane coatings and include paints, clear coatings, or stains. The cured coating for a Type I urethane coating is formed by air oxidation and polymerization of the unsaturated drying oil residue in the binder.

By the term "unsaturated polyester coating" as used hereinafter is meant a conventional liquid coating based on unsaturated polyester resins, dissolved in monomers and containing initiators and catalysts as needed, typically as a paint, clear coating, stain, or gel coat formulation.

By the term "water-dispersed coatings" as used herein is meant surface coatings intended for the decoration or protection of a substrate, comprising essentially an emulsion, latex, or suspension of a film-forming material dispersed in an aqueous phase, and optionally containing surfactants, protective colloids and thickeners, pigments and extender pigments, preservatives, fungicides, freeze-thaw stabilizers, antifoam agents, agents to control pH, coalescing aids, and other ingredients. Water-dispersed coatings are exemplified by, but not limited to, pigmented coatings such as latex paints, unpigmented coatings such as wood sealers, stains, and finishes, coatings for masonry and cement, and water-based asphalt emulsions. For latex paints the film forming material is a latex polymer of acrylate acrylic, styrene acrylic, vinyl-acrylic, vinyl, or a mixture thereof. Such water-dispersed coating compositions are described by C. R. Martens in "Emulsion and Water-Soluble Paints and Coatings" (Reinhold Publishing Corporation, New York, N.Y., 1965).

By the term "coating base" as used herein is meant a liquid formulation of a water-dispersed coating, an epoxy polymer coating, an alkyd coating, a Type I urethane coating, or an unsaturated polyester coating, which is later applied to a substrate for the purpose of creating a lasting film on said surface. The coating base includes those solvents, pigments, fillers, and functional additives found in a conventional liquid coating. For example, the coating base formulation may include a polymer resin and pigment dispersed in water, where the polymer resin is an acrylic polymer latex, vinyl-acrylic polymer, vinyl polymer, Type I urethane polymer, alkyd polymer, epoxy polymer, or unsaturated polyester polymer, or mixtures thereof.

The present invention comprises a composition comprising (a) a coating base selected from a water-dispersed coating, an epoxy polymer coating, an alkyd coating, a Type I urethane coating, or an unsaturated polyester coating; and (b) a crosslinkable polymer made by reacting: (i) a fluoropolymer comprising the repeat Unit A, at least one of repeat Units B or C, and optionally one or more of repeat Units D or E, in any order; with

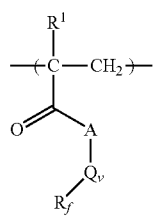

Unit A

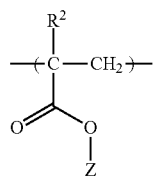

Unit B

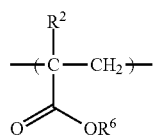

Unit C

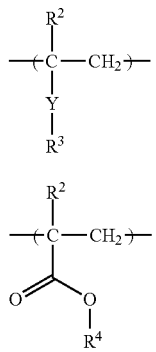

Unit D

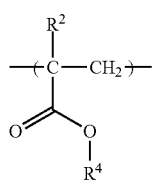

Unit E (ii) a hydroxyl-reactive compound or carboxylic acid-reactive compound selected from the group consisting of a polyamine compound having at least 2 amine groups, an isocyanate-terminated silane, an isocyanate-terminated vinylic or (meth)acrylic compound, a glycidyl group-containing vinylic or (meth)acrylic compound, a carbodiimide compound, a blend of polyisocyanate with a hydroxyl-terminated vinylic or (meth)acrylic compound, and mixtures thereof; wherein the composition comprises (a) the coating base in an amount of from about 95 to 99.98% and (b) the crosslinkable polymer in an amount of from about 0.02 to 5% by weight, based on the total weight of (a) and (b); $R_f$ is a straight or branched-chain perfluoroalkyl group of 2 to 20 carbon atoms, optionally interrupted by one or more ether oxygens —O—, —CH$_2$—, —CFH—, or combinations thereof; A is O, S, or N($R^2$); Q is a straight chain, branched chain or cyclic structure of alkylene, alkoxy, arylene, aralkylene, sulfonyl, sulfoxy, sulfonamido, carbonamido, carbonyloxy, urethanylene, ureylene, or combinations of such linking groups; v is 0 or 1; $R^1$ is H or CH$_3$; $R^2$ is independently selected from H or a linear or branched alkyl of 1 to about 4 carbon atoms; Z is a hydrophilic group selected from a hydroxy-terminated straight or branched alkyl of 1 to 10 carbons; hydroxy-terminated straight or branched alkoxylate having 2 to 20 alkoxylate repeat units; or hydroxyalkyl-terminated straight or branched alkoxylate having 2 to 20 alkoxylate repeat units; $R^3$ is a straight or branched alkyl chain of 2 to 30 carbons having 1 to 15 olefinic units, or mixtures thereof; Y is selected from —CH$_2$O—, —C(O)O—, —OC(O)—, —R$^5$OC(O)—, —C(O)O(CH$_2$CH$_2$O)$_m$(CH$_2$CH(CH$_3$)O)$_n$—, or —C(O)OR$^5$O—; $R^5$ is a straight or branched alkylene of 1 to 10 carbons; m and n are independently integers of 0 to 20, provided that m+n>0; $R^4$ is a straight chain, branched chain, or cyclic structure alkyl group of 1 to 30 carbons; $R^6$ is H, Na, Li, Cs, K, HN($R^2$)$_3$, or mixtures thereof; Unit A is present in an amount of about 10 to 60 mol %; Unit B is present in an amount of about 0 to 40 mol %; Unit C is present in an amount of about 0 to 40 mol %; Unit D is present in an amount of about 0 to 50 mol %; and Unit E is present in an amount of about 0 to 50 mol %; wherein the sum of Units B and C amounts is a positive mol %, and wherein the sum of monomer repeat units is equal to 100%.

The fluoropolymers comprise two or more repeating units derived from monomers from each of five groups. Monomers forming Unit A are fluorinated monomers such as perfluoroalkylalkyl (meth)acrylates, monomers forming Unit B are hydrophilic monomers such as hydroxyalkyl (meth)acrylates or alkoxylated (meth)acrylates, monomers forming Unit C are acidic monomers such as (meth)acrylic acid which are optionally neutralized to form a salt, monomers forming Unit D are olefin-group-containing monomers such as fatty acid (meth)acrylate, and monomers forming Unit E are hydrophobic monomers such as alkyl (meth) acrylates. The repeating units can occur in any random, block, or other sequence in the proportions described above.

The fluoropolymer compound contains repeat units from Units A and one or both of Units B and C. In one embodiment, Unit A is present in an amount from about 10 to about 60 mol %; in another embodiment, Unit A is present in an amount from about 25 to about 55 mol %; and in a third embodiment, Unit A is present in an amount from about 30 to about 50 mol %. In one embodiment, Unit B is present in an amount from about 0.1 to about 50 mol %; in another embodiment, Unit B is present in an amount from about 2 to 40 mol %; in a third embodiment, Unit B is present in an amount from about 2 to about 30 mol %; and in a fourth embodiment, Unit B is present in an amount from about 2 to about 25 mol %. In one embodiment, Unit C is present in an amount of at least 0.1 mol %; in another embodiment, Unit C is present in an amount from about 1 to about 60 mol %; and in a third embodiment, Unit C is present in an amount from about 20 mol % to about 60 mol %. In one embodiment, Unit D is also present in the polymer composition in an amount of at least 0.1 mol %; in another embodiment, Unit D is present in an amount from about 0.1 to about 40 mol %; and in a third embodiment, Unit D is present in an amount from about 1 to about 30 mol %. In another embodiment, Unit E is present in the polymer composition in an amount of at least 0.1 mol %; in another embodiment, Unit E is present in an amount from about 0.1 to about 60 mol %; and in a third embodiment, Unit E is present in an amount from about 10 to about 30 mol %. In another embodiment, at least four of Units A, B, C, D, or E are present; and in yet a further embodiment, all five of Units A, B, C, D, and E are present.

The crosslinkable copolymer (b) must have a molecular weight high enough to provide cleanability and durability but low enough to allow the polymer molecules to migrate through the coating medium. In one embodiment, the number average molecular weight $M_n$ is about 1500 to about 50,000 Daltons; in a second embodiment, the number average molecular weight $M_n$ is about 5000 to about 40,000 Daltons; and in a third embodiment, the number average molecular weight $M_n$ is about 8000 to about 35,000 Daltons. In one embodiment, the weight average molecular weight $M_w$ is about 5000 to about 50,000 Daltons; in a second embodiment, the weight average molecular weight $M_w$ is about 8000 to about 30,000 Daltons; and in a third embodiment, the weight average molecular weight $M_w$ is about 10,000 to about 20,000 Daltons. The polydispersity index (PDI) may be about 1.0 to about 3.0; in another embodiment, about 1.1 to about 2.0, and in a third embodiment, about 1.2 to about 1.9. In another embodiment, the crosslinkable polymer is a hyperbranched polymer that results from the copolymerization with a monomer with at least two ethylenic unsaturated groups. In this case, the $M_w$ can be up to 300,000, and PDI may be up to 6.0.

Fluorinated (meth)acrylate monomers useful for forming Unit A are synthesized from the corresponding alcohols. These fluorinated (meth)acrylate compounds are prepared by either esterification of the corresponding alcohol with (meth)acrylic acid or by transesterification with methyl (meth)acrylate. Such preparations are well-known in the art.

In one embodiment, $R_f$ in Unit A is a straight or branched-chain perfluoroalkyl group predominately containing from 2 to 6 carbon atoms, optionally interrupted by one or more ether oxygens —O—, —$CH_2$— or —CFH— groups. More particularly, $R_f$ in Unit A is a straight chain perfluoroalkyl group of 2 to 6 carbon atoms, and in another embodiment, 4 to about 6 carbon atoms. One preferred embodiment of the monomer forming Unit A is a perfluoroalkylethyl (meth) acrylate having the formula:

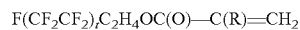

$$F(CF_2CF_2)_tC_2H_4OC(O)-C(R)=CH_2$$

wherein t is 1 to about 3 or a mixture thereof, and preferably predominately 2 to about 3 or a mixture thereof, and R is H or methyl.

Examples of suitable linking groups Q in Unit A include straight chain, branched chain or cyclic structures of alkylene, arylene, alkoxy, aralkylene, sulfonyl, sulfoxy, sulfonamido, carbonamido, carbonyloxy, urethanylene, ureylene, and combinations of such linking groups such as sulfonamidoalkylene. In one embodiment, Q is a straight chain alkylene of 1 to about 15 carbon atoms or —CONR' $(C_sH_{2s})$—, the $(C_sH_{2s})$ group is linear or branched, and preferably is linear. In this case, s is 1 to 14. Within moiety A and Q, the alkyl in R' is linear or branched. In one embodiment, Q is a straight or branched alkylene of 1 to 4 carbon atoms, and in a second embodiment, Q is a straight or branched alkylene of 2 to 4 carbon atoms. Mixtures of fluorinated monomers may also be used.

Suitable fluorinated alcohols capable of forming the fluorinated (meth)acrylate monomers include but are not limited to $C_4F_9SO_2NH(CH_2)_3OH$, $C_6F_{13}SO_2NH(CH_2)_3OH$, $C_5F_{17}SO_2NH(CH_2)_3OH$, $C_4F_9SO_2NH(CH_2)_2OH$, $C_6F_{13}SO_2NH(CH_2)_2OH$, $C_5F_{17}SO_2NH(CH_2)_2OH$, $C_4F_9SO_2N(CH_3)(CH_2)_2OH$, $C_6F_{13}SO_2N(CH_3)(CH_2)_2OH$, $C_5F_{17}SO_2N(CH_3)(CH_2)_2OH$, $C_4F_9CH_2CF_2SO_2NH(CH_2)_3OH$, $C_3F_7OCF_2CF_2SO_2NH(CH_2)_3OH$, $C_4F_9CH_2CH_2CF_2CF_2SO_2NH(CH_2)_3OH$, $C_4F_9OCFHCH_2CH_2SO_2NH(CH_2)_3OH$, $C_4F_9SO_2CH_2CH_2NH(CH_2)_3OH$, $C_6F_{13}SO_2CH_2CH_2NH(CH_2)_3OH$, $C_5F_{17}SO_2CH_2CH_2NH(CH_2)_3OH$, $C_4F_9CH_2CH_2SO_2NHCH_2CH_2OH$, $C_6F_{13}CH_2CH_2SO_2NHCH_2CH_2OH$, $C_5F_{17}CH_2CH_2SO_2NHCH_2CH_2OH$, $C_4F_9CH_2CH_2SO_2N(CH_3)CH_2CH_2OH$, $C_6F_{13}CH_2CH_2SO_2N(CH_3)CH_2CH_2OH$, $C_5F_{17}CH_2CH_2SO_2N(CH_3)CH_2CH_2OH$, $C_4F_9(CH_2)_2OH$, $C_6F_{13}(CH_2)_2OH$, $C_5F_{17}(CH_2)_2OH$, $C_4F_9OH$, $C_6F_{13}OH$, $C_5F_{17}OH$, $C_4F_9CH_2CH_2OH$, $C_6F_{13}CH_2CH_2OH$, $C_4F_9CH_2OH$, $C_6F_{13}CH_2OH$, $C_4F_9CH_2CF_2CH_2CH_2OH$, $C_6F_{13}CH_2CF_2CH_2CH_2OH$, $C_4F_9CH_2CF_2CH_2CF_2CH_2CH_2OH$, $C_6F_{13}CH_2CF_2CH_2CF_2CH_2CH_2OH$, $C_3F_7OCF_2CF_2CH_2CH_2OH$, $C_2F_5OCF_2CF_2CH_2CH_2OH$, $CF_3OCF_2CF_2CH_2CH_2OH$, $C_3F_7(OCF_2CF_2)_2CH_2CH_2OH$, $C_2F_5(OCF_2CF_2)_2CH_2CH_2OH$, $CF_3(OCF_2CF_2)_2CH_2CH_2OH$, $C_3F_7OCHFCF_2OCH_2CH_2OH$, $C_2F_5OCHFCF_2OCH_2CH_2OH$, $CF_3OCHFCF_2OCH_2CH_2CH_2OH$, $C_3F_7OCHFCF_2OCH_2CH_2CH_2OH$, $C_2F_5OCHFCF_2OCH_2CH_2CH_2OH$, $CF_3OCHFCF_2OCH_2CH_2CH_2OH$, $C_4F_9CH_2CH_2SCH_2CH_2OH$, $C_6F_{13}CH_2CH_2SCH_2CH_2OH$, $C_4F_9SCH_2CH_2OH$, $C_6F_{13}SCH_2CH_2OH$, $C_4F_9CH_2CH_2CF_2CF_2CH_2CH_2OH$, $C_3F_7OCF(CF_3)C(O)NHCH_2CH_2OH$, $C_3F_7OCF(CF_3)C(O)N(CH_3)CH_2CH_2OH$, $C_4F_9NHC(O)NHCH_2CH_2OH$, $C_6F_{13}NHC(O)NHCH_2CH_2OH$, $HCF_2(CF_2)_4CH_2OH$, $HCF_2(CF_2)_6CH_2OH$, $HCF_2(CF_2)_8CH_2OH$, similar variations thereof, and mixtures thereof.

Examples of monomers used for form Unit B include (meth)acrylates containing a hydrophilic pendant group selected from a hydroxy-terminated straight or branched alkyl of 1 to 10 carbons; hydroxy-terminated straight or branched alkoxylate having 2 to 20 alkoxylate repeat units; or hydroxyalkyl-terminated straight or branched alkoxylate having 2 to 20 alkoxylate repeat units. Suitable examples include, but are not limited to, one or more hydroxyalkyl (meth)acrylates, alkyloxy (meth)acrylates, or poly(alkylene glycol) (meth)acrylates. Suitable hydroxyalkyl (meth)acrylates have alkyl chain lengths of 2 to 4 carbon atoms, and include 2-hydroxyethyl acrylate, 2-hydroxyethyl methacrylate, 3-hydroxypropyl acrylate, and 3-hydroxypropyl methacrylate. In one embodiment, $R^2$ is H or alkyl radical of 1 to 2 carbon atoms. Where Unit B is formed from one or more alkoxylated (meth)acrylates or poly(alkylene glycol) (meth)acrylates, suitable monomers may contain between 1 and 40 oxyalkylene units per molecule. In another embodiment, monomers contain from 2 to 20 oxyalkylene units per molecule, and in a third embodiment, from 4 to 12 oxyalkylene units per molecule. Such monomers include but are not limited to ethyltriethyleneglycol (meth)acrylate, ethoxylated (meth)acrylates, poly(ethylene glycol) (meth)acrylates, poly(ethylene glycol) methyl ether (meth)acrylates, propoxylated (meth)acrylates, poly(propylene glycol) (meth)acrylates, or poly(propylene glycol) methyl ether (meth) acrylates.

In one embodiment, the crosslinkable polymer is made by reacting Unit B with a hydroxyl-reactive compound having a second crosslinkable functional group. The repeat units of Unit B may be partially or completely reacted with such hydroxyl-reactive compounds. For example, when it is desired that some hydroxyl functionality remains in the crosslinkable polymer, the amount of hydroxyl-reactive compound is selected such that there is a molar excess of Unit B. Such hydroxyl-reactive compounds may include but are not limited to an isocyanate-terminated silane, an isocyanate-terminated vinylic or (meth)acrylic compound, or a blend of polyisocyanate with a hydroxyl-terminated vinylic or (meth)acrylic compound, and mixtures thereof. When isocyanate-terminated silanes are chosen, the silane functional group is capable of reacting with other compounds from a coating base, including inorganic oxides such as those commonly used as pigments, via sol-gel chemistry. Isocyanate-terminated silane compounds may be trialkoxyisocyanatosilanes. When isocyanate-terminated vinylic or (meth)acrylic compounds are employed, the ethylenic unsaturated groups of the vinylic or (meth)acrylic functional groups are capable of polymerizing with other crosslinkable polymer molecules or with additional ethylenically unsaturated compounds after migrating to the coating surface. Such compounds include but are not limited to isocyanatoalkylmethacrylates or isocyanatoalkyl vinyl compounds.

When a blend of a polyisocyanate with a hydroxyl-terminated vinylic or (meth)acrylic compound is used, the polyisocyanate serves to link to hydroxyl-functional Unit B with the ethylenically functional hydroxyl-terminated vinylic or (meth)acrylic compound. Like the isocyanate-terminated vinylic or (meth)acrylic compound, the unsaturated groups of the vinylic or (meth)acrylic functional groups are capable of polymerizing with other crosslinkable polymer molecules or with additional ethylenically unsaturated compounds after migrating to the coating surface. Hydroxy-terminated (meth)acrylic compounds include any of those compounds mentioned above for forming Unit B. Additionally, hydroxyl-terminal compounds include but are not limited to hydroxyalkyl vinyl compounds, allylic or methallylic polyether alcohols, or acrylic or methacrylic polyether alcohols. Specific examples include but are not limited to poly(ethylene glycol) allyl ethers, allyl alcohols including diallyl alcohol, hydroxyethyl (meth)acrylate, hydroxypropyl (meth)acrylate, hydroxybutyl (meth)acrylate, and ethoxylated (meth)acrylates. For the polyisoycanate, any isocyanate compound having at least 2 isocyanate groups may be used. Specific examples include those found under the DESMODUR brand, available from Bayer Corporation, Pittsburgh, Pa.

In another embodiment, the crosslinkable polymer is made by reacting Unit C with a carboxylic acid-reactive compound selected from the group consisting of a polyamine compound having at least 2 amine groups, an isocyanate-terminated silane, an isocyanate-terminated vinylic or (meth)acrylic compound, a glycidyl group-containing vinylic or (meth)acrylic compound, a carbodiimide compound, a blend of polyisocyanate with a hydroxyl-terminated vinylic or (meth)acrylic compound, and mixtures thereof. The repeat units of Unit C may be partially or completely reacted with such carboxylic acid-reactive compounds. For example, when it is desired that some acidic functionality remains in the crosslinkable polymer, the amount of carboxylic acid-reactive compound is selected such that there is a molar excess of Unit C. In another embodiment, the carboxylic acid-reactive compound is a polyamine compound having at least 2 amine groups, a glycidyl group-containing vinylic or (meth)acrylic compound, or a carbodiimide compound. In one embodiment, the crosslinkable polymer is made by reacting Unit C with a carboxylic acid-reactive compound selected from a polyamine compound having at least 2 amine groups, a glycidyl group-containing vinylic or (meth)acrylic compound, a carbodiimide compound, or mixtures thereof.

Where Unit C is present, the monomers used to form Unit C are acrylic acid or methacrylic acid; and $R^6$ is H, Na, Li, Cs, K, $HN(R^2)_3$, or mixtures thereof. In one embodiment, $R^6$ is $NH_4$ or Na, or a mixture thereof. Repeat units of Unit C can be formed by neutralizing the copolymer with a base, including but not limited to alkali metal hydroxides, alkali metal carbonates, ammonia, alkyl amines, or alkanolamines.

The isocyanate-terminated silane, isocyanate-terminated vinylic or (meth)acrylic compound, and blend of polyisocyanate with a hydroxyl-terminated vinylic or (meth)acrylic compound useful for reaction with Unit C are the same types of compounds described above for reaction with Unit B. Where polyamine compounds having at least 2 amine groups are chosen, the terminal amine group or groups of the crosslinkable polymer are free to further react with other crosslinking polymer molecules, with coating resin polymers, or with other additives in the coating composition, including acidic compounds, isocyanate compounds, or inorganic pigments or extenders. Examples of useful polyamine compounds having at least 2 amine groups include but are not limited to aliphatic diamines of the formula $R^7_2N(CH_2)_rNR^7_2$, where each $R^7$ is independently H or an alkyl of 1 to 4 carbons and r is 1 to 20; polyether diamines of the formula $R^7_2N(R^8O)_rNR^7_2$, where $R^8$ is a linear or branched alkylene of 2 to 4 carbons and $R^7$ and r are defined as above; hydroxyl amines such as N,N,N',N'-tetrakis(2-hydroxypropyl)ethylenediamine, N,N'-bis(2-hydroxyethyl)ethylenediamine, N,N,N',N'-tetrakis(2-hydroxyethyl)ethylenediamine, or N-(2-hydroxyethyl)ethylenediamine; aromatic diamines such as 1-N-benzylbenzene-1,4-diamine, (R)-(+)-1,1'-binaphthyl-2,2'-diamine, (S)-(−)-1,1'-binaphthyl-2,2'-diamine, 1,1'-binaphthyl-2,2'-diamine, trans-4-cyclohexene-1,2-diamine dihydrochloride, 4-bromobenzene-1,3-diamine dihydrochloride, 1,2,4-thiadiazole-3,5-diamine, 4-ethoxybenzene-1,2-diamine, 4-propoxy-1,2-diamine benzene, 5-iodopyrimidine-4,6-diamine, tetrahydrothiophene-3,4-diamine 1,1-dioxide dihydrochloride, (1R,2R)-4-cyclohexene-1,2-diamine, (1S,2S)-4-cyclohexene-1,2-diamine, N-phenyl-benzene-1,3-diamine, trans-N,N'-dimethylcyclohexane-1,2-diamine, 6-methyl-1,3,5-triazine-2,4-diamine, or 2,3-dihydro-1,4-benzodioxine-6,7-diamine; polyamines such as 1,3-diaminopentane, diethylenetriamine, triethylenetetramine, tetraethylenepetnamine, pentaethylenehexamine, hexaethyleneheptamine, aminoethylenepiperazine, aminoethylethanolamine; or mixtures of any one or more of these. Some suitable ethyleneamines and amine blends are available from Huntsman, Woodlands, Tex.

When glycidyl group-containing vinylic or (meth)acrylic compounds are chosen, the ethylenically unsaturated groups may further react as described above. The glycidyl group-containing compounds include but are not limited to glycidyl (meth)acrylate or allyl glycidyl ether. When carbodiimide compounds are used, the carbodiimide of the crosslinkable polymer is free to further react with other crosslinking polymer molecules, with coating resin polymers, or with other additives in the coating composition, which including carboxylic acid groups.

In one embodiment, the monomers used to form Unit D are at least one vinylic or (meth)acrylic monomer having a straight or branched alkyl chain of 2 to 30 carbons and having 1 to 15 olefinic units. In one embodiment, the alkyl chain contains 2 to 22 carbons, and in a third embodiment, the alkyl chain contains 3 to 18 carbons. The alkyl chains may contain 1 to 15 olefinic units but in another embodiment may contain 1 to 6 olefinic units, and in a third embodiment may contain 1 to 3 olefinic units. Such monomers may be formed from the reaction of hydroxyl-terminal (meth)acrylates or allylic compounds with fatty acids. Where Y is —C(O)O(CH$_2$CH$_2$O)$_m$(CH$_2$CH(CH$_3$)O)$_n$— or —C(O)OR$^5$O—, the monomer is the reaction product of an alkoxylated (meth)acrylic or vinylic alcohol with fatty acids. Fatty acids may include but are not limited to oleic acid, linoleic acid, ricinoleic acid, erucic acid, palmitoleic acid, vaccenic acid, eicosenoic acid, eladic acid, eurucicic acid, nervonic acid, pinolenic acid, arachidonic acid, eicosapentaenoic acid, docosahexanoic acid, eicosadienoic acid, docosatetranoic acid, and mixtures thereof. Specific examples of monomers used to form Unit D include but are not limited to oleic (meth)acrylate, linoleic (meth)acrylate, palmitic methyl ester, soybean oil methyl ester, sunflower oil methyl ester, oleic ethyl (meth)acrylate, ricinoleic (meth)acrylate, erucic (meth)acrylate, palmitoleic (meth)acrylate, vaccenic (meth)acrylate, eicosenoic (meth)acrylate, eladic (meth)acrylate, eurucicic (meth)acrylate, nervonic (meth)acrylate, pinolenic (meth)acrylate, arachidonic (meth)acrylate, eicosapentaenoic (meth)acrylate, docosahexanoic (meth)acrylate, eicosadienoic (meth)acrylate, docosatetranoic (meth)acrylate, and versions of the same having different chain lengths.

Unit E may be formed from (meth)acrylic monomers having pendant straight chain, branched chain, or cyclic structure alkyl groups of 1 to 30 carbons. In one embodiment, the alkyl groups contain 1 to 22 carbons, and in a third embodiment, the alkyl groups contain 6 to 22 carbons. Specific examples of such monomers include but are not limited to stearyl (meth)acrylate, tridecyl (meth)acrylate, lauryl (meth)acrylate, 2-ethylhexyl (meth)acrylate, cyclohexyl (meth)acrylate, hexyl (meth)acrylate, octyl (meth)acrylate, decyl (meth)acrylate, isodecyl (meth)acrylate, lauryl (meth)acrylate, palmitic (meth)acrylate, caprylic (meth)acrylate, captric (meth)acrylate, mysteric (meth)acrylate, arachidic (meth)acrylate, behenic (meth)acrylate, lignoceric (meth)acrylate, or cetyl (meth)acrylate.

The fluoropolymer may or may not further comprise additional repeat units outside of the units, resulting from the use of additional monomers. Suitable monomers are ethylenically-unsaturated monomers, including but not limited to, amine monomers such as diethylaminoethyl acrylate and/or dimethylaminoethyl methacrylate, glycidyl (meth)acrylates, aminoalkyl methacrylate hydrochloride, acrylamide, alkyl acrylam ides, or n-methylol (meth)acrylamide. When no additional repeat units outside of the units are used, then the sum of Units A+B+C+D+E is equal to 100%. When additional repeat units are present, then the sum Units A+B+C+D+E+any additional monomer repeat units is equal to 100%.

The fluoropolymer optionally further comprises a residue of a chain transfer agent, known as a polymerization regulator. The term "residue" is herein defined as the portion of the chain transfer agent structure that is covalently bonded to the polymer molecule. The total polymer reaction mixture may also include some polymer molecules that do not contain the chain transfer agent residue.

The chain transfer agent can be used in amounts to limit or control the molecular weight of the fluoropolymer, typically in amounts of about 1 to 25 mol %, preferably about 2 to 20 mol %, more preferably about 3 to 15 mol %, and most preferably 5 to 10 mol %, based on the total amount of chain transfer agent and monomers employed. Chain transfer agents may include hydrophobic chain transfer agents, including dodecyl mercaptans, or may an include a hydrophilic chain transfer agent. In one embodiment, the chain transfer agent has the formula (I)

$$(V\text{—}X\text{—}S)_g H_{2-g}, \qquad (I)$$

wherein g is 1 or 2 X is a linear or branched alkylene of 1 to about 4 carbon atoms, optionally substituted with one or more hydrophilic functional groups selected from hydroxyl, carboxyl, or amine; and V is a hydrophilic functional group selected from hydroxyl, carboxyl, thiol, or amine. Where g=2, the chain transfer agents are disulfide compounds of the formula Y—X—S—S—X—Y. Suitable chain transfer agents include but are not limited to dodecanethiol, thioglycerol, mercaptoethanol, thioglycolic acid, dithioerythritol, 2-mercaptopropionic acid, and 3-mercaptopropionic acid, or mixtures thereof.

The fluoropolymers in the present invention are prepared by polymerization of the fluorinated and hydroxyl group- or carboxylic acid-containing monomers. The polymerization process comprises contacting the fluorinated and non-fluorinated (meth)acrylate monomers as defined hereinabove in an organic solvent in the presence of a free radical initiator, chain transfer agent, and optionally other monomers in an inert atmosphere. For example, the monomers can be mixed in a suitable reaction vessel equipped with an agitation device. A heating source and a cooling source are provided as necessary. In a typical process, the fluorinated and non-fluorinated monomers are combined in the reaction vessel with the solvent and chain transfer agent to provide a reaction mixture, and the reaction mixture is heated to an appropriate temperature, e.g. 80° C. Alternatively, the monomers may be fed one at a time, or in a mixture, to an existing solution in a reaction vessel at a selected feed rate. In this embodiment, the existing solution in the reaction vessel may contain the solvent; the solvent and chain transfer agent; or the solvent, chain transfer agent, and one or more monomers. In another embodiment, the chain transfer agent may be fed alone, or in a mixture with one or more monomers, to an existing solution in a reaction vessel at a selected feed rate. In this embodiment, the existing solution in the reaction vessel may contain the solvent; the solvent and one or more monomers; or the solvent, one or more monomers, and the initiator. In each embodiment, the initiator may be included in the existing solution or may be fed into the reactor at a later time.

Temperatures in the range of 20-90° C. may be suitable where organic peroxides or azo compounds are used, depending, for example, on the choice of organic solvent and the choice of free radical initiator. Temperatures of 0-50° C. are suitable where oxidation-reduction (redox) initiators are used. The free radical initiator is typically added after the reaction mixture has reached the appropriate reaction or activation temperature.

Suitable free radical initiators include organic peroxides and azo compounds. Examples of particularly useful organic peroxides are benzoyl peroxide, t-butyl peroxide, acetyl peroxide, and lauryl peroxide. Examples of particularly useful azo compounds include 2,2'-azobis(2-amidinopropane dihydrochloride, 2,2'-azobis(isobutyramidine) dihydrochloride, and azodiisobutylronitrile. Azo initiators are commercially available from E. I. du Pont de Nemours and Company, Wilmington, Del., under the name of "VAZO".

Suitable redox initiators include potassium or ammonium peroxydisulfate; combinations of peroxides such as hydrogen peroxide with $Fe^{2+}$, $Cr^{2+}$, $V^{2+}$, $Ti^{3+}$, $Co^{2+}$, $Cu^+$; combinations of $HSO_3^-$, $SO_3^{2-}$, $S_2O_3^{2-}$, or $S_2O_5^{2-}$ with $Ag^+$, $Cu^{2+}$, $Fe^{3+}$, $ClO^{3-}$, or $H_2O_2$; combinations of organic alcohols with $Ce^{4+}$, $V^{5+}$, $Cr^{6+}$, or $Mn^{3+}$; and combinations of peroxydiphosphate compounds with $Ag^+$, $V^{5+}$, or $Co^{2+}$. Such systems may be used when low temperature or rapid activation is desirable.

The free radical initiator is generally added over a period of time after the reaction monomers have dissolved in the solvent and/or after the reaction mixture is at the desired temperature. The radical initiator is added in an effective amount. By an "effective amount" of a radical initiator is meant an amount sufficient to initiate the reaction between the monomers and preferably to sustain the reaction for a sufficient period of time to maximize yield of the polymer product. An effective amount of initiator will vary with the exact composition and reaction conditions used. An effective amount of initiator for a given set of conditions is easily determined experimentally by one skilled in the art.

Suitable solvents are alkanes, alcohols and ketones having boiling points of less than 130° C. Suitable organic solvents useful in the preparation of the fluoropolymer include methyl isobutyl ketone, butyl acetate, tetrahydrofuran, acetone, isopropanol, ethyl acetate, methylene chloride, chloroform, carbon tetrachloride, cyclohexane, hexane, dioxane, hexafluoroisopropanol, and mixtures of two or more thereof.

Cyclohexane, isopropanol, methyl isobutyl ketone, or mixtures thereof are preferred. Blends of isopropanol and methyl isobutyl ketone are particularly preferred, since both solvents form azeotropes with water boiling below 100° C., facilitating their removal from the final aqueous dispersion. Blends of organic solvents with other types of co-solvents, including water, may also be used. Preferred are isopropanol/methyl isobutyl ketone blends containing between about 20% and about 80% of methyl isobutyl ketone.

The copolymer as described above used in the method of the present invention is preferably in the form of an aqueous dispersion. After the polymerization is complete, as can be monitored by $^1H$ NMR, the acidic polymer solution can be neutralized using a basic water solution to form an aqueous dipserion. The amount of base necessary is calculated by assuming complete salt formation of all acid functionalities. Optionally 0-5% mole percent excess of base is added to ensure conversion of all acid to salt. The final pH of the emulsion is between about 6 and about 9, and preferably is between 6 and 8. The bases suitable for the neutralization are alkali metal hydroxides, alkali metal carbonates, ammonia, alkyl amines, or alkanolamines. Ammonia solution is preferred. Following neutralization, the organic solvents may be removed by distillation to form a completely aqueous system.

The fluoropolymers formed may then be post-modified with one of the hydroxyl group- or carboxyolic acid group-reactive compounds. The processes for post-modification depend on the type of chemical reaction desired, but such reaction may be carried out by any conventional processes known to a skilled chemist. The fluoropolymers may be post-modified directly after polymer formation, as a separate post-modification reaction step prior to contacting the polymer with the coating base, or by adding the hydroxyl- or carboxylic acid-reactive compound and the fluoropolymer separately into the coating base.

The crosslinkable polymer compositions produced as described above may be used directly in a coating composition, or added solvent (the "application solvent") may be added to achieve a desirable solids content. The application solvent is typically a solvent selected from the group consisting of alcohols and ketones.

The crosslinkable polymer compositions are useful as coatings additives, wherein the crosslinkable polymer composition can be added to a coating base, which is applied to a substrate. When the coating is applied to a substrate, the additive compound is allowed to first migrate to the surface and subsequently crosslink to form a durable oil-, dirt-, and water-repellent surface.

As noted above, the coating base is a liquid formulation of a water-dispersed coating, an epoxy polymer coating, an alkyd coating, a Type I urethane coating, or an unsaturated polyester coating, which is later applied to a substrate for the purpose of creating a lasting film on said surface. In one embodiment, the coating base comprises a polymer which having pendant hydroxyl or carboxylic acid groups. The coating base includes those solvents, pigments, fillers, and functional additives found in a conventional liquid coating. Typically, the coating base may include a resin compound from 10 to 60% by weight, from 0.1 to 80% by weight of functional additives including pigments, fillers, and other additives, and the balance of the coating base composition is water or solvent. For an architectural coating, the resin compound is in an amount of about 30 to 60% by weight, functional additives including pigments, extenders, fillers, and other additives are in an amount of 0.1 to 60% by weight, with the balance being water or solvent.

The coating compositions may further comprise additional components to provide surface effects to the resulting coating. For example, the composition may further comprise a non-polymeric ethylenically unsaturated crosslinkable compound to provide additional crosslinking sites for the crosslinkable polymer compound. In one embodiment, this non-polymeric crosslinkable compound is (c) a fatty acid compound in an amount of about 0.001 to 1% by weight, based on the total weight sum of coating base (a)+crosslinkable polymer (b)+fatty acid (c). Any fatty acid, including those listed above for use in forming the monomer of Unit D, may be employed. In one embodiment, the fatty acid (c) is the same fatty acid used to form the monomer of Unit D. In another embodiment, the composition further comprises an inorganic oxide particle, or the coating base further comprises an inorganic oxide particle. In another embodiment, the coating compositions further comprise a polymerization initiator, such as a photoinitiator. Such compounds aid in further crosslinking the crosslinkable polymers once migrated to the coating surface.

The coating compositions may also include a pigment. Such a pigment may be part of the coating base formulation, or may be added subsequently. Any pigment can be used with the present invention. The term "pigment" as used herein means opacifying and non-opacifying ingredients which are particulate and substantially non-volatile in use. Pigment as used herein includes ingredients labeled as pigments, but also ingredients typically labeled in the coating trade as inerts, extenders, fillers, and similar substances.

Representative pigments that can be used with the present invention include, but are not limited to, rutile and anatase $TiO_2$, clays such as kaolin clay, asbestos, calcium carbonate, zinc oxide, chromium oxide, barium sulfate, iron oxide, tin oxide, calcium sulfate, talc, mica, silicas, dolomite, zinc sulfide, antimony oxide, zirconium dioxide, silicon dioxide, cadmium sulfide, cadmium selenide, lead chromate, zinc chromate, nickel titanate, diatomaceous earth, glass fibers, glass powders, glass spheres, MONASTAL Blue G (C.I. Pigment Blue 15), molybdate Orange (C.I. Pigment Red 104), Toluidine Red YW (C.I. Pigment 3)-process aggregated crystals, Phthalo Blue (C.I. Pigment Blue 15)-cellulose acetate dispersion, Toluidine Red (C.I. Pigment Red 3), Watchung Red BW (C.I. Pigment Red 48), Toluidine Yellow GW (C.I. Pigment Yellow 1), MONASTRAL Blue BW (C.I. Pigment Blue 15), MONASTRAL Green BW (C.I. Pigment Green 7), Pigment Scarlet (C.I. Pigment Red 60), Auric Brown (C.I. Pigment Brown 6), MONASTRAL Green G (C.I. Pigment Green 7), MONASTRAL Maroon B, MONASTRAL Orange, and Phthalo Green GW 951.

Titanium dioxide ($TiO_2$) is the preferred pigment to use with the present invention. Titanium dioxide pigment, useful in the present invention, can be in the rutile or anatase crystalline form. It is commonly made by either a chloride process or a sulfate process. In the chloride process, $TiCl_4$ is oxidized to $TiO_2$ particles. In the sulfate process, sulfuric acid and ore containing titanium are dissolved, and the resulting solution goes through a series of steps to yield $TiO_2$. Both the sulfate and chloride processes are described in greater detail in "The Pigment Handbook", Vol. 1, 2nd Ed., John Wiley & Sons, NY (1988), the teachings of which are incorporated herein by reference.

When used as an additive to a coating base, the crosslinkable polymer compound is effectively introduced to the coating base by thoroughly contacting, e.g., by mixing the fluoropolymer composition with the coating base. The contacting of fluoropolymer and coating base can be performed, for example and conveniently, at ambient temperature. More elaborate contacting or mixing methods can be employed such as using a mechanical shaker or providing heat. Such methods are generally not necessary and generally do not substantially improve the final coating composition.

The crosslinkable polymer of the invention is generally added at about 0.02 weight % to about 5 weight % on a dry weight basis of the crosslinkable polymer to the weight of the wet paint. In one embodiment, from about 0.02 weight % to about 0.5 weight % is used, and in a third embodiment, from about 0.05 weight % to about 0.25 weight % of the crosslinkable polymer compound is added to the paint. The crosslinkable polymer is typically in the form of an aqueous dispersion, aqeous emulsion, organic solvent-based dispersion or emulsion, or organic solvent-based solution. In one aspect, the crosslinkable polymer is different in composition than the polymer of the coating base resin.

In another embodiment, the invention comprises a process of for forming a coating with improved dirt pickup resistance comprising (a) contacting a coating base selected from a water-dispersed coating, an epoxy polymer coating, an alkyd coating, a Type I urethane coating, or an unsaturated polyester coating; with a crosslinkable polymer; (b) applying the mixture to a substrate to form a coating; (c) allowing the crosslinkable polymer to migrate to the coating surface to form a crosslinkable surface coating, and (d) subsequently reacting the crosslinkable surface coating; wherein the coating comprises the coating base in an amount of from about 95 to 99.98% and the crosslinkable polymer in an amount of from about 0.02 to 5% by weight, based on the total weight of the coating base and the crosslinkable polymer; the crosslinkable polymer is the reaction product of (i) a polymer comprising the repeat Unit A, at least one of repeat Units B or C, and optionally one or more of repeat Units D or E, in any order; with (ii) a hydroxyl-reactive compound or carboxylic acid-reactive compound selected from the group consisting of a diamine compound, an isocyanate-terminated silane, an isocyanate-terminated vinylic or (meth)acrylic compound, a glycidyl group-containing vinylic or (meth)acrylic compound, a carbodiimide compound, a blend of polyisocyanate with a hydroxyl-terminated vinylic or (meth)acrylic compound, and mixtures thereof; wherein $R_f$ is a straight or branched-chain perfluoroalkyl group of 2 to 20 carbon atoms, optionally interrupted by one or more ether oxygens —O—, —$CH_2$—, —CFH—, or combinations thereof; A is O, S, or $N(R^2)$; Q is a straight chain, branched chain or cyclic structure of alkylene, alkoxy, arylene, aralkylene, sulfonyl, sulfoxy, sulfonamido, carbonamido, carbonyloxy, urethanylene, ureylene, or combinations of such linking groups; v is 0 or 1; $R^1$ is H or $CH_3$; $R^2$ is independently selected from H or a linear or branched alkyl of 1 to about 4 carbon atoms; Z is a hydrophilic group selected from a hydroxy-terminated straight or branched alkyl of 1 to 10 carbons; hydroxy-terminated straight or branched alkoxylate having 2 to 20 alkoxylate repeat units; or hydroxyalkyl-terminated straight or branched alkoxylate having 2 to 20 alkoxylate repeat units; $R^3$ is a straight or branched alkyl chain of 2 to 30 carbons having 1 to 15 olefinic units, or mixtures thereof; Y is selected from —$CH_2$O—, —C(O)O—, —OC(O)—, —$R^5$OC(O)—, —C(O)O($CH_2CH_2O)_m(CH_2CH(CH_3)O)_n$—, or —C(O)O$R^5$O—; $R^5$ is a straight or branched alkylene of 1 to 10 carbons; m and n are independently integers of 0 to 20, provided that m+n>0; $R^4$ is a straight chain, branched chain, or cyclic structure alkyl group of 1 to 30 carbons; $R^6$ is H, Na, Li, Cs, K, $HN(R^2)_3$, or mixtures thereof; Unit A is present in an amount of about 10 to 60 mol %; Unit B is present in an amount of about 0 to 40 mol %; Unit C is present in an amount of about 0 to 40 mol %; Unit D is present in an amount of about 0 to 50 mol %; and Unit E is present in an amount of about 0 to 50 mol %; wherein the sum of Units B and C amounts is a positive mol %, and wherein the sum of monomer repeat units is equal to 100%.

The coating compositions of the present invention are useful for providing a protective and/or decorative coating to a wide variety of substrates. Such substrates include primarily construction materials and hard surfaces. The substrate is preferably selected from the group consisting of wood, metal, wallboard, masonry, concrete, fiberboard, and paper. Other materials may also be used as the substrate.

The coatings of the present invention may be used to treat a substrate by contacting the substrate with a coating composition comprising a coating base and a crosslinkable polymer and drying or curing the coating composition on the substrate. Any method of contacting a coating composition with a substrate can be used. Such methods are well known to a person skilled in the art, such as by brush, spray, roller, doctor blade, wipe, dip, foam, liquid injection, immersion or casting. Following application of the coating to a substrate, the polymer compound is polymerized using any conventional means, including allowing the additive to crosslink in air by oxidative curing. Radiation curing, including UV curing, may also be employed. Cure initiators and additives may be combined with the coating compositions to improve cure efficiency.

The compositions of the present invention provide performance as well as durability to coatings. They impart unexpectedly desirable surface effects such as: increased water and oil contact angles, enhanced dirt pickup resistance, and enhanced cleanability to the coating films. For these reasons, the compositions of the present invention are particularly useful in exterior coatings and paints.

Materials and Test Methods

All solvents and reagents, unless otherwise indicated, were purchased from Sigma-Aldrich and used directly as supplied. 1H,1H,2H,2H-perfluorooctyl methacrylate and 1H,1H,2H,2H-perfluorooctyl acrylate were obtained from DuPont Chemicals & Fluoroproducts. PICASSIAN XL-732 is a water-based carbodiimide crosslinker commercially available from Stahl Polymers, Waalwijk, Netherlands. Molecular weight analysis was performed using a Size Exclusion Chromatography (SEC) system [Alliance 2695™, Waters Corporation (Milford, Mass.)] equipped with a differential refractive index detector, multi-angle light scattering photometer and a differential capillary viscometer ViscoStar™. Monomer conversion during polymerization was estimated via 1H NMR using mesytlene as an internal standard.

Test Methods

Dosing of Polymer Additives in Paint and Test Panel Application

Aqueous dispersions of fluoroacrylic copolymers of the present invention were added at 350 ppm fluorine levels to selected commercially available interior and exterior latex paints that were, prior to dosing, free of fluoroadditives. The sample was mixed using an overhead Cowles Blade stirrer at 600 rpm for 10 minutes. The mixture was then transferred to a glass bottle, sealed and placed on a roll mill overnight to allow uniform mixing of the fluoropolymer. The samples were then drawn down uniformly on a black Leneta Mylar® card (5.5"×10") or Aluminium Q-panel (4"×12") via a BYK-Gardner drawdown apparatus using 5 mL bird-applicator. The paint films were then allowed to dry at room temperature for 7 days.

Test Method 1. Evaluation of Oil Repellency via Contact Angle Measurement

Oil contact angle measurements were used to test for the migration of fluoroadditive to the surface of the paint film. Oil contact angle testing was performed by goniometer on 1 inch strips of Leneta panel coated with dried paint film.

A Ramé-Hart Standard Automated Goniometer Model 200 employing DROP image standard software and equipped with an automated dispensing system, 250 μl syringe, and illuminated specimen stage assembly was used. The goniometer camera was connected through an interface to a computer, allowing the droplet to be visualized on a computer screen. The horizontal axis line and the cross line could both be independently adjusted on the computer screen using the software.

Prior to contact angle measurement, the sample was placed on the sample stage and the vertical vernier was adjusted to align the horizontal line (axis) of the eye piece coincident to the horizontal plane of the sample. The horizontal position of the stage relative to the eye piece was positioned so as to view one side of the test fluid droplet interface region at the sample interface.

To determine the contact angle of the test fluid on the sample, approximately one drop of test fluid was dispensed onto the sample using a 30 μL pipette tip and an automated dispensing system to displace a calibrated amount of the test fluid. For oil contact angle measurements, hexadecane was suitably employed. Horizontal and cross lines were adjusted via the software in case of the Model 200 after leveling the sample via stage adjustment, and the computer calculated the contact angle based upon modeling the drop appearance. The initial contact angle is the angle determined immediately after dispensing the test fluid to the sample surface. Initial contact angles above 30 degrees are indicators of effective oil repellency.

Test Method 2. Dirt Pick-Up Resistance (DPR) Test for Exterior Paints

DPR testing was used to evaluate the ability of the painted panels to prevent dirt accummulation. An artificial dry dirt comprised of silica gel (38.7%), aluminum oxide powder (38.7%), black iron oxide powder (19.35%) and lamp black powder (3.22%) was used for this test. The dust components were mixed and placed on a roller for 48 hours for thorough mixing and stored in a decicator.

Exterior paint samples were drawn down to Aluminium Q-panels cut to a size of 1.5"×2", and four replicates of these samples were taped onto a 4"×6" metal panel. The initial whiteness ($L^*_{initial}$) of each Q-panel was measured using a Hunter Lab colorimeter. The 4"×6" metal panel was then inserted into a 45 degree angle slot cut in a wooden block. The dust applicator containing metal mesh dispensed the dust on the panels until the panels were completely covered with dust. The excess dust was then removed by lightly tapping the mounted panels 5 times on the wooden block inside the shallow tray. The 4"×6" panel which held the dusted panels was then clamped onto a Vortex-Genie 2 for 60 seconds to remove any remaining dust. The panel was then removed and tapped 10 times to dislodge any remaining dust. The whiteness ($L^*_{dusted}$) of each 1.5"×2" sample was re-measured using the same colorimeter, and the difference in whiteness before and after dusting was recorded. The values were averaged. DPR is expressed in terms of $\Delta L^*$, where $\Delta L^* = (L^*_{initial} - L^*_{dusted})$. A lower $\Delta L^*$ value indictes better dirt pick-up resistance.

Test Method 3. Water Wash Durability (Oil Contact Angle)

Exterior paint samples were drawn down to Aluminum Q-panels cut to a size of 1.5"×2", fixed at an angle of 45°, and set to wash with running water for five minutes at a flow rate of 1 L/minute. The samples were air dried for 7 days, and oil contact angles were then measured as described in Test Method 1.

Test Method 4. Weathering (WOM) for DPR and Oil Contact Angle Durability

Accelerated weathering of coated Q-panels was performed in an ATLAS Ci5000 Xenon Lamp Weather-o-Meter. The Xenon lamp was equipped with Type S Boro Inner and Outer Filters. Weathering cycles were performed according to D6695, cycle 2. During the weathering period, the panels were subjected to repeated 2-hour programs, which included 18 minutes of light and water spray followed by 102 minutes of light only. During the entire program, panels were held at 63° C. and during the UV only segment relative humidity was held at 50%.

For a 24-hour WOM program, freshly coated aluminum Q-panels were allowed to air dry for 7-days. The initial whiteness (L*initial) of each Q-panel was measured using a Hunter Lab colorimeter. One set of panels was subjected to DPR testing (as per Test Method 2) as well as oil and water contact angle testing (as per Test Method 1). A duplicate set of panels was placed in the weather-o-meter and allowed to proceed through 12 continuous 2-hour cycles according to the description above. After completion of the weathering cycles, the panels were dried, evaluated according to Test Methods 1 and 2, and re-subjected to DPR.

EXAMPLES

Preparation of Polymer 1

A 250 mL three-necked RB flask was equipped with a reflux condenser, a nitrogen sparge line, a TEFLON-coated magnetic stir bar, and a dip-tube for measurement of the internal temperature via a thermocouple was charged with methyl isobutyl ketone (MIBK, 11 mL) and isopropanol (IPA, 25 mL). The solution was subjected to sub-surface sparging with $N_2$ using a needle for 1 hour at room temperature. A separate 100-mL flask, equipped with a rubber septum and nitrogen inlet, was charged with 1H,1H,2H,2H-perfluorooctyl methacrylate (14.58 g, 33.8 mmol), hydroxyethyl methacrylate (2.51 g, 19.3 mmol), and methacrylic acid (3.16 g, 36.74 mmol). The solution was subjected to sub-surface sparging with $N_2$ for 1 hour at room temperature. The monomer solution was diluted to a total volume of 20 mL using MIBK/IPA from the first flask. A solution of VAZO 67 (0.395 g, 2.05 mmol) was prepared using sparged MIBK/IPA (19 mL) from the first reaction flask.

1-Thioglycerol (0.84 g, 7.76 mmol) was added to the remaining sparged MIBK/IPA solvent, and the reactor was heated to 80° C. When the reaction temperature reached 80° C., the monomer and initiator solutions were separately charged via the syringe pump over 6 hours. The reaction was allowed to stir for an additional 16 hours at 80° C. Monomer consumption was monitored via $^1$H NMR using mesitylene as an internal standard (97% conversion). The polymer sample was also analyzed by GPC ($M_n$=5.49 kDa and PDI=1.8).

The polymer solution in MIBK/IPA was heated back to 70° C. A neutralization solution consisting of $NH_4OH$ (2.85 g, 47.0 mmol) in $H_2O$ (58.3 mL) was prepared and heated to 45° C. The ammonia solution was added dropwise to the polymer solution via addition funnel over 20 minutes to achieve a cloudy solution. The solution was stirred at 70° C. for an additional 1 hour and the MIBK/IPA was removed under vacuum to produce 85.5 g of a hazy yellow dispersion of polymer in water with a pH 8.0. The dispersion was determined to be 23.2 wt % solids.

Preparation of Polymer 2

The Preparation of Polymer 1 process was followed, using only MIBK (25 mL), for the polymerization of 1H,1H,2H,2H-perfluorooctyl methacrylate (14.58 g, 33.8 mmol), hydroxyethyl methacrylate (5.45 g, 41.88 mmol), stearyl methacrylate (11.79 g, 34.8 mmol), and methacrylic acid (0.73 g, 8.44 mmol). 1-Thioglycerol (1.04 g, 9.62 mmol) was used as chain transfer agent. Monomer consumption was monitored (98% conversion). The polymer sample was also analyzed by GPC ($M_n$=6.6 kDa and PDI=2.1). The solids concentration from the organic phase was calculated to be 61.4 wt %.

Preparation of Polymer 3

By following a similar procedure as described in the Preparation of Polymer 2, semi-batch polymerization was performed with 1H,1H,2H,2H-perfluorooctyl methacrylate (14.58 g, 33.8 mmol), hydroxyethyl methacrylate (3.29 g, 25.31 mmol), methacrylic acid (2.18 g, 25.31 mmol) VAZO 67 (0.395 g, 2.05 mmol), and 1-thioglycerol (0.988 g, 9.13 mmol) in MIBK, providing the polymer solution with 99% monomer conversion CH NMR). The polymer sample was analyzed by GPC ($M_n$=6.6 kDa and PDI=2.2). The solids concentration from the organic phase was calculated to be 59.6 wt %.

Preparation of Polymer 4

By following a similar procedure as described in the Preparation of Polymer 1, semi-batch polymerization was performed with 1H,1H,2H,2H-perfluorooctyl methacrylate (14.58 g, 33.8 mmol), hydroxyethyl methacrylate (1.13 g, 8.7 mmol), stearyl methacrylate (11.79 g, 34.8 mmol), methacrylic acid (0.75 g, 8.7 mmol), VAZO 67 (0.395 g, 2.05 mmol), and 1-thioglycerol (1.04 g, 9.62 mmol), providing a polymer solution with >95% conversion. The polymer sample was analyzed by GPC ($M_n$=4.6 kDa and PDI=1.5). The solids concentration from the organic phase was calculated to be 50.8 wt %.

Example 1

A commercially available polycarbodiimide cross-linker PICASSIAN XL-732 (40 wt % solid) was diluted in water containing a drop of $NH_4OH$ to make a 1.6 weight % solution. This stock solution (0.075 g) was added to the unneutralized Polymer 1 (0.33 g 25 wt % solid) solution in MIBK/IPA. The mixture was stirred for 30 minutes. A calculated amount of the resulting polymer dispersion (350 ppm of F) was added to samples of exterior test paint, and the drawdown panels were cured at room temperature followed by 70° C. for 2 hours. The panels were evaluated as per the test methods described.

Example 2

Example 1 was repeated, except a 4 weight % stock solution of PICASSIAN XL-732 was used by the combination of 0.20 g of stock solution to 0.33 g of Polymer 1.

Example 3

A polycarbodiimide cross-linker PICASSIAN XL-732 (20 mg, 40 wt % solid) was blended with Polymer 1 (21 mg, 25 wt % solid) in 50 g of exterior paint. Drawdowns were performed and dried panels were cured at 70° C. for 2 hours. The panels were evaluated as per the test methods described.

Example 4

To 100 g of exterior test paint was added Polymer 1 at 350 ppm Fluorine. To this mixture was added (3-glycidyloxy-propyl)-trimethoxysilane (0.8 g). The bottle was capped and rolled on a mill for five days. A paint film was cast on an aluminum Q-panel with a 5 mil doctor blade and allowed to air dry for seven days. The dried coating was passed though a UV light source for a minute and evaluated as per the test methods described.

Example 5

Example 4 was repeated, using trimethylol-propane diallyl ether (0.4 g).

Example 6

Example 4 was repeated, using diethoxy (3-glycidyloxypropyl)methylsilane (0.4 g).

Example 7

Example 4 was repeated, using epoxidized soybean oil acrylate (2.0 g).

Example 8

Example 7 was repeated, except Polymer 4 was blended with 1.0 g of epoxidized soybean oil acrylate.

Example 9

Example 4 was repeated, except Polymer 4 was blended with 1,4-butanediol diglycidyl ether (0.5 g).

Example 10

To 100 g of exterior test paint was added Polymer 1 at 350 ppm Fluorine. To this mixture was added TYZOR 131 organic titanate (0.5 g). The bottle was capped and rolled on a mill for five days. A paint film was cast on an aluminum Q-panel with a 5 mil doctor blade and allowed to air dry for seven days. The dried coating was heat cured for 5 minutes at 60 C and evaluated as per the test methods described.

Comparative Example A

Samples of exterior test paint, without additive, were applied to drawdown panels and evaluated as per the test methods described.

Comparative Example B

Polymer 1 was added to exterior test paint at 350 ppm Fluorine and evaluated as per the test methods described.

Comparative Example C

Polymer 4 was added to exterior test paint at 350 ppm Fluorine and evaluated as per the test methods described.

TABLE 1

Performance of Examples 1-10 with Comparative Examples A-C.

| Example | Oil Contact Angle* | | | DPR (ΔL)** | |
|---|---|---|---|---|---|
| | Initial | After water wash | After WOM | Initial | After WOM |
| 1 | 78 | 69 | 42 | 0.61 | 1.7 |
| 2 | 77 | 71 | 47 | 0.72 | 1.9 |
| 3 | 75 | 72 | 51 | 0.78 | 2.4 |
| 4 | 70 | 64 | 42 | 2.0 | 3.1 |
| 5 | 72 | 64 | 42 | 2.7 | 3.1 |
| 6 | 77 | 70 | 56 | 1.6 | 2.3 |
| 7 | 74 | 66 | 84 | 1.41 | 3.38 |
| 8 | 63 | — | 27 | 5 | 4.64 |
| 9 | 62 | — | 35 | 5.57 | 4.62 |
| 10 | 67 | 59 | 32 | 2.2 | 3.5 |
| A | 0 | 0 | 0 | 8.5 | 10.2 |
| B | 73 | 56 | 20 | 1.5 | 2.8 |
| C | 65 | 55 | 22 | 3.7 | 3.4 |

*A higher value indicates better contact angle performance.
**A lower value indicates better DPR performance.

The cross-linked polymers in Example 1-10 showed better oil contact angle retention and comparable or better DPR performance when compared with corresponding non-cross linked polymers of Comparative Examples B-C.

Example 11

To a solution of Polymer 2 in MIBK (2.0 g, 61.4 weight % solid) was added 2-isocyanatoethyl methacrylate (0.225 g, 1.45 mmol) and dibutyltin dilaurate (0.02 g) under nitrogen atmosphere. The mixture stirred at room temperature for 12 hours under nitrogen. A calculated amount of the resulting polymer solution (350 ppm of Fluorine) was added to samples of exterior test paint and the drawdown panels were dried at room temperature. Panels were further cured by passing through UV light for 2 minutes. The panels were evaluated as per the test methods described.

Example 12

To a solution of Polymer 2 in MIBK (2.0 g, 61.4 weight % solid) was added 3-(triethoxysilyl)propyl isocyanate (0.358 g, 1.45 mmol) and dibutyltin dilaurate (0.03 g) under nitrogen atmosphere. The mixture stirred at room temperature for 12 hours under nitrogen. A calculated amount of the resulting polymer solution (350 ppm of F) was quickly added to samples of exterior test paint and the drawdown panels were dried at room temperature. The panels were evaluated as per the test methods described.

Example 13

A solution of Polymer 3 in MIBK (1.0 g, 50.6 weight % solids) was diluted with MIBK (0.3 g) and charged with allyl glycidylether (0.135 g, 1.19 mmol) and pyridine (0.005 g) under nitrogen atmosphere. The mixture stirred at room temperature for 12 hours under nitrogen. A calculated amount of the resulting polymer solution (350 ppm of F) was added to samples of exterior test paint and the drawdown panels were dried at room temperature. Panels were further cured by passing through UV light for 2 minutes. The panels were evaluated as per the test methods described.

Example 14

Example 13 was repeated, using glycidyl methacrylate (0.169 g, 1.19 mmol) instead of allyl glycidylether.

Comparative Example D

Polymer 3 was added to exterior test paint at 350 ppm Fluorine and evaluated as per the test methods described.

Comparative Example E

Polymer 2 was added to exterior test paint at 350 ppm Fluorine and evaluated as per the test methods described.

TABLE 2

Performance of Examples 11-14 with Comparative Examples A and C-E.

| Example | Oil Contact Angle* | | | DPR (ΔL)** | |
|---|---|---|---|---|---|
| | Initial | After water wash | After WOM | Initial | After WOM |
| 11 | 74 | 63 | 31 | 1.2 | 2.8 |
| 12 | 67 | 63 | 36 | 1.7 | 2.3 |
| 13 | 69 | 64 | 44 | 3.5 | 2.1 |
| 14 | 70 | 61 | 40 | 3.2 | 2.5 |
| A | 0 | 0 | 0 | 8.5 | 10.2 |
| C | 65 | 55 | 22 | 3.7 | 3.4 |
| D | 65 | 56 | 22 | 3.7 | 3.4 |
| E | 74 | 62 | 58 | 4.4 | 1.6 |

*A higher value indicates better contact angle performance.
**A lower value indicates better DPR performance.

The cross-linked polymers in Example 11-14 showed better oil contact angle retention and comparable or better DPR performance when compared with corresponding non-cross linked polymers of Comparative Examples A, C, and D. Additionally, Examples 11-14 showed improved initial dirt pickup resistance when compared with Comparative Examples A, C, D, and E, and superior or comparable DPR after WOM.

Example 15

A 250 mL three-necked round bottom flask was equipped with a reflux condenser, a nitrogen sparge line, a TEFLON-coated magnetic stir bar, and a dip-tube for measurement of the internal temperature via a thermocouple was charged with MIBK (11 mL) and IPA (25 mL). The solution was subjected to sub-surface sparging with $N_2$ using a needle for 1 hour at room temperature. A separate 100-mL flask, equipped with a rubber septum and nitrogen inlet, was charged with 1H,1H,2H,2H-perfluorooctyl methacrylate (14.58 g, 33.8 mmol), hydroxyethyl methacrylate (1.46 g, 33.8 mmol), methacrylic acid (3.16 g, 36.74 mmol), and tetramethylethylenediamine (2.12 g, 18.2 mmol). The solution was subjected to sub-surface sparging with $N_2$ using a needle for 1 hour at room temperature. The monomer solution was diluted to a total volume of 20 mL using MIBK/IPA from the first flask. A solution of VAZO 67 (0.395 g, 2.05 mmol) was prepared using sparged MIBK/IPA (19 mL) from the first reaction flask.

1-Thioglycerol (0.988 g, 9.13 mmol) was added to the first reaction flask containing the remaining sparged MIBK/IPAsolvent, and the reactor was heated to 80° C. When the reaction temperature reached 80° C., the monomer and initiator solutions were charged via the syringe pump over 6 hours. The reaction was allowed to stir for an additional 16 hours at 80° C. Monomer consumption was monitored via $^1$H NMR using mesitylene as an internal standard (93% conversion). The polymer sample was also analyzed by GPC, however measurement was complex due to the cross-linked acid-amine ionic complex network.

The reaction mixture was kept at 80° C. A solution consisting of $H_2O$ (58.3 mL) was heated to 45° C. and added to the polymer solution dropwise via addition funnel over 20 minutes to achieve a cloudy solution. The solution was stirred at 80° C. for an additional 60 minutes. The quenched polymer solution was transferred to a 1000 mL round bottom flask and the MIBK/IPA was removed in vacuum to produce of a hazy yellow dispersion (86.7 g, pH 7). The dispersion was determined to be 19.8 wt % solids. A calculated amount of this polymer dispersion (350 ppm of F) was added to samples of exterior test paints and evaluated as per the test methods described.

Example 16

By following the procedure of Example 15, semi-batch polymerization was performed using 1H,1H,2H,2H-perfluorooctyl methacrylate (14.58 g, 33.8 mmol), hydroxyethyl methacrylate (2.015 g, 15.48 mmol), methacrylic acid (3.16 g, 36.74 mmol), VAZO 67 (0.395 g, 2.05 mmol), and 1-thioglycerol (1.04 g, 9.62 mmol), providing the polymer solution with >94% monomer conversion ($^1$H NMR). The solids content of the organic phase was determined to be 39.6%. The polymer sample was analyzed by GPC ($M_n$=3.7 kDa and PDI=2.1). 10 grams of the polymer solution was re-warmed to 80° C. in a 50-mL 3 neck round bottom flask equipped with stir bar and reflux condenser. In a separate 25 mL Erlenmeyer flask, with magnetic stirring, was combined JEFFAMINE ED-600 (2.11 g, 7 mmol) and distilled water (10 g). The solution was heated to 45° C., and the amine mixture was added slowly into the polymer solution by pipette. Stirring was continued for 1 hour at 80° C., and the mixture was coolrf to room temperature and placed under vacuum at 45° C. to remove the residual solvent. A portion of the aqueous dispersion was lyophilized for further analysis and was calculated to be 24 weight % solids. A calculated amount of this polymer dispersion (350 ppm of F) was added to samples of exterior test paints and evaluated as per the test methods described.

Example 17

Example 16 was repeated, using N,N-dimethylhexadecylamine (1.89 g, 7 mmol) instead of JEFFAMINE ED-600. A portion of the aqueous dispersion was lyophilized for further analysis and was calculated to be 32.2 weight % solids. A calculated amount of this polymer dispersion (350 ppm F) was added to samples of exterior test paints and evaluated as per the test methods described.

TABLE 3

Performance of Examples 15-17 with Comparative Examples A-B.

| Example | Oil Contact Angle* | | | DPR (ΔL)** | |
|---|---|---|---|---|---|
| | Initial | After water wash | After WOM | Initial | After WOM |
| 15 | 69 | 62 | 41 | 1.4 | 2.7 |
| 16 | 74 | 64 | 43 | 1.07 | 1.9 |
| 17 | 73 | 69 | 45 | 1.37 | 2.2 |
| A | 0 | 0 | 0 | 8.5 | 10.2 |
| B | 73 | 56 | 20 | 1.5 | 2.8 |

*A higher value indicates better contact angle performance.
**A lower value indicates better DPR performance.

The cross-linked polymers in Example 15-17 showed better oil contact angle retention and comparable or better DPR performance when compared with corresponding non-cross linked polymers of Comparative Examples A and B.

What is claimed is:

1. A composition comprising
   a. a coating base selected from a water-dispersed coating, an epoxy polymer coating, an alkyd coating, a Type I urethane coating, or an unsaturated polyester coating; and
   b. a crosslinkable polymer made by reacting:
      i. a fluoropolymer comprising the repeat Unit A, at least one of repeat Units B or C, and optionally one or more of repeat Units D or E, in any order; with

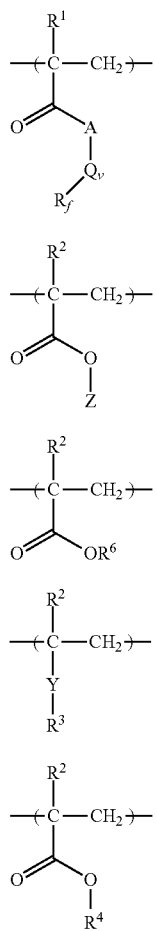

ii. a hydroxy-reactive compound or carboxylic acid-reactive compound selected from the group consisting of a polyamine compound having at least 2 amine groups, an isocyanate-terminated silane, an isocyanate-terminated vinylic or (meth)acrylic compound, a glycidyl group-containing vinylic or (meth)acrylic compound, a carbodiimide compound, a blend of polyisocyanate with a hydroxyl-terminated vinylic or (meth)acrylic compound, and mixtures thereof;
   wherein
      the composition comprises (a) the coating base in an amount of from about 95 to 99.98% and (b) the crosslinkable polymer in an amount of from about 0.02 to 5% by weight, based on the total weight of (a) and (b);

$R_f$ is a straight or branched-chain perfluoroalkyl group of 2 to 20 carbon atoms, optionally interrupted by one or more ether oxygens —O—, —$CH_2$—, —CFH—, or combinations thereof;

A is O, S, or $N(R^2)$;

Q is a straight chain, branched chain or cyclic structure of alkylene, alkoxy, arylene, aralkylene, sulfonyl, sulfoxy, sulfonamido, carbonamido, carbonyloxy, urethanylene, ureylene, or combinations thereof;

v is 0 or 1;

$R^1$ is H or $CH_3$;

$R^2$ is independently selected from H or a linear or branched alkyl of 1 to about 4 carbon atoms;

Z is a hydrophilic group selected from a hydroxy-terminated straight or branched alkyl of 1 to 10 carbons; hydroxy-terminated straight or branched alkoxylate having 2 to 20 alkoxylate repeat units; or hydroxyalkyl-terminated straight or branched alkoxylate having 2 to 20 alkoxylate repeat units;

$R^3$ is a straight or branched alkyl chain of 2 to 30 carbons having 1 to 15 olefinic units, or mixtures thereof;

Y is selected from $CH_2O$—, —C(O)O—, —OC(O)—, —$R^5OC(O)$—, —$C(O)O(CH_2CH_2O)_m(CH_2CH(CH_3)O)_n$—, or —$C(O)OR^5O$—;

$R^5$ is a straight or branched alkylene of 1 to 10 carbons;

m and n are independently integers of 0 to 20, provided that m+n>0;

$R^4$ is a straight chain, branched chain, or cyclic structure alkyl group of 1 to 30 carbons;

$R^6$ is H, Na, Li, Cs, K, $HN(R^2)_3$, or mixtures thereof;

Unit A is present in an amount of about 10 to 60 mol %;

Unit B is present in an amount of about 0 to 40 mol %;

Unit C is present in an amount of about 0 to 40 mol %;

Unit D is present in an amount of about 0 to 50 mol %; and

Unit E is present in an amount of about 0 to 50 mol %;

wherein the sum of Units B and C amounts is a positive mol %, and wherein the sum of monomer repeat units is equal to 100%.

2. The composition of claim 1, where the crosslinkable polymer has a number average molecular weight Mn of about 1500 to about 50,000 Daltons.

3. The composition of claim 1, where the amount of Unit C is a positive mol %.

4. The composition of claim 3, where the crosslinkable polymer is made by reacting Unit C with a carboxylic acid-reactive compound selected from a polyamine compound having at least 2 amine groups, a glycidyl group-containing vinylic or (meth)acrylic compound, or a carbodiimide compound.

5. The composition of claim 1, where the amount of Unit B is a positive mol %.

6. The composition of claim 5, where the crosslinkable polymer is made by reacting Unit B with a hydroxyl-reactive compound selected from an isocyanate-terminated vinylic or (meth)acrylic compound, an isocyanate-terminated silane, or a blend of polyisocyanate with a hydroxyl-terminated vinylic or (meth)acrylic compound.

7. The composition of claim 1, where the fluoropolymer further comprises a residue from a hydrophilic chain transfer agent of formula (I)

wherein
   g is 1 or 2
   X is a linear or branched alkylene of 1 to about 4 carbon atoms, optionally substituted with one or more hydrophilic functional groups selected from hydroxyl, carboxyl, or amine; and V is a hydrophilic functional group selected from hydroxyl, carboxyl, thiol, or amine.

8. The composition of claim 1, where the coating base is a water-dispersed coating selected from an aqueous acrylic latex paint.

9. The composition of claim 1, where the coating base comprises an additive selected from $TiO_2$, clays, asbestos, calcium carbonate, zinc oxide, chromium oxide, barium sulfate, iron oxide, tin oxide, calcium sulfate, talc, mica, silicas, dolomite, zinc sulfide, antimony oxide, zirconium dioxide, silicon dioxide, cadmium sulfide, cadmium selenide, lead chromate, zinc chromate, nickel titanate, diatomaceous earth, glass fibers, glass powders, glass spheres, blue pigments, red pigments, yellow pigments, orange pigments, process aggregated crystals, brown pigments, or green pigments.

10. A process for forming a coating with improved dirt pickup resistance comprising
    a. contacting a coating base selected from a water-dispersed coating, an epoxy polymer coating, an alkyd coating, a Type I urethane coating, or an unsaturated polyester coating; with a crosslinkable polymer to form a coating composition;
    b. applying the coating composition to a substrate to form a coating;
    c. allowing the crosslinkable polymer to migrate to the coating surface to form a crosslinkable surface coating, and
    d. subsequently reacting the crosslinkable surface coating; wherein the coating comprises the coating base in an amount of from about 95 to 99.98% and the crosslinkable polymer in an amount of from about 0.02 to 5% by weight, based on the total weight of the coating base and the crosslinkable polymer;

the crosslinkable polymer is the reaction product of
i. a fluoropolymer comprising the repeat Unit A, at least one of repeat Units B or C, and optionally one or more of repeat Units D or E, in any order; with

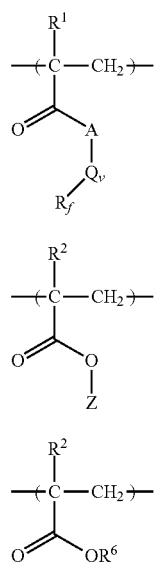

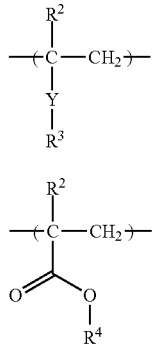

ii. a hydroxyl-reactive compound or carboxylic acid-reactive compound selected from the group consisting of a polyamine compound having at least 2 amine groups, an isocyanate-terminated silane, an isocyanate-terminated vinylic or (meth)acrylic compound, a glycidyl group-containing vinylic or (meth)acrylic compound, a carbodiimide compound, a blend of polyisocyanate with a hydroxyl-terminated vinylic or (meth)acrylic compound, and mixtures thereof;

wherein
$R_f$ is a straight or branched-chain perfluoroalkyl group of 2 to 20 carbon atoms, optionally interrupted by one or more ether oxygens —O—, —$CH_2$—, —CFH—, or combinations thereof;

A is O, S, or $N(R^2)$;

Q is a straight chain, branched chain or cyclic structure of alkylene, alkoxy, arylene, aralkylene, sulfonyl, sulfoxy, sulfonamido, carbonamido, carbonyloxy, urethanylene, ureylene, or combinations thereof;

v is 0 or 1;

$R^1$ is H or $CH_3$;

$R^2$ is independently selected from H or a linear or branched alkyl of 1 to about 4 carbon atoms;

Z is a hydrophilic group selected from a hydroxy-terminated straight or branched alkyl of 1 to 10 carbons; hydroxy-terminated straight or branched alkoxylate having 2 to 20 alkoxylate repeat units; or hydroxyalkyl-terminated straight or branched alkoxylate having 2 to 20 alkoxylate repeat units;

$R^3$ is a straight or branched alkyl chain of 2 to 30 carbons having 1 to 15 olefinic units, or mixtures thereof;

Y is selected from —$CH_2$O—, —C(O)O—, —OC(O)—, —$R^5$OC(O)—, —$C(O)O(CH_2CH_2O)_m(CH_2CH(CH_3)O)_n$—, or —$C(O)OR^5O$—;

$R^5$ is a straight or branched alkylene of 1 to 10 carbons;

m and n are independently integers of 0 to 20, provided that m+n>0;

$R^4$ is a straight chain, branched chain, or cyclic structure alkyl group of 1 to 30 carbons;

$R^6$ is H, Na, Li, Cs, K, $HN(R^2)_3$, or mixtures thereof;

Unit A is present in an amount of about 10 to 60 mol %;

Unit B is present in an amount of about 0 to 40 mol %;

Unit C is present in an amount of about 0 to 40 mol %;

Unit D is present in an amount of about 0 to 50 mol %; and

Unit E is present in an amount of about 0 to 50 mol %;

wherein the sum of Units B and C amounts is a positive mol %, and wherein the sum of monomer repeat units is equal to 100%.

11. The process of claim 10, where the crosslinkable polymer has a number average molecular weight Mn of about 1500 to about 50,000 Daltons.

12. The composition of claim 1, where the amount of Unit C is a positive mol %, and the crosslinkable polymer is made by reacting Unit C with a carboxylic acid-reactive compound selected from a polyamine compound having at least 2 amine groups, a glycidyl group-containing vinylic or (meth)acrylic compound, or a carbodiimide compound.

13. The composition of claim 1, where the amount of Unit B is a positive mol %, and the crosslinkable polymer is made by reacting Unit B with a hydroxyl-reactive compound selected from an isocyanate-terminated vinylic or (meth)acrylic compound, an isocyanate-terminated silane, or a blend of polyisocyanate with a hydroxyl-terminated vinylic or (meth)acrylic compound.

14. The process of claim 10, where the hydroxyl-reactive compound or carboxylic acid-reactive compound is selected from the group consisting of an isocyanate-terminated vinylic or (meth)acrylic compound, a glycidyl group-containing vinylic or (meth)acrylic compound, a blend of polyisocyanate with a hydroxyl-terminated vinylic or (meth)acrylic compound, and mixtures thereof, and the curing step occurs by radiation-initiated polymerization.

15. A coated substrate made by the process of claim 10.

16. The coated substrate of claim 15, where the substrate is selected from the group consisting of wood, metal, wallboard, masonry, concrete, fiberboard, and paper.

\* \* \* \* \*